US012301753B2

(12) United States Patent
Merchant

(10) Patent No.: US 12,301,753 B2
(45) Date of Patent: May 13, 2025

(54) SYSTEMS AND METHODS FOR AUTHENTICATION USING BROWSER FINGERPRINTING

(71) Applicant: Pindrop Security, Inc., Atlanta, GA (US)

(72) Inventor: MohammedAli Merchant, Wilmington, DE (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 17/378,567

(22) Filed: Jul. 16, 2021

(65) Prior Publication Data

US 2023/0015583 A1   Jan. 19, 2023

(51) Int. Cl.
*H04M 3/00* (2024.01)
*H04L 9/32* (2006.01)
(Continued)

(52) U.S. Cl.
CPC ...... *H04M 3/42076* (2013.01); *H04L 9/3231* (2013.01); *H04M 3/42042* (2013.01); *H04M 3/42161* (2013.01)

(58) Field of Classification Search
CPC ......... H04W 12/06; H04W 8/18; H04W 4/16; H04W 76/00; H04W 76/10; H04W 12/02; H04W 12/66; H04W 12/065; H04W 12/71; H04W 12/72; H04M 3/42068; H04M 3/4365; H04M 3/5166; H04M 2203/6081; H04M 3/382; H04M 3/493; G06Q 20/4014; G06Q 20/3223; G06Q 20/405; G06Q 20/102; G06Q 20/40; G06Q 20/322;
(Continued)

(56) References Cited

U.S. PATENT DOCUMENTS 8,964,965 B1    2/2015  Kunins et al.
9,479,471 B2 *  10/2016 Schoenrock ............ H04L 51/23
(Continued)

FOREIGN PATENT DOCUMENTS

WO    WO-2016/030835 A1    3/2016

OTHER PUBLICATIONS

International Search Report and Written Opinion on PCT Appl. PCT/US2022/036506 dated Nov. 1, 2022 (9 pages).

*Primary Examiner* — Kharye Pope
(74) *Attorney, Agent, or Firm* — Foley & Lardner LLP

(57) ABSTRACT

Embodiments described herein provide for authenticating callers to call centers using browser fingerprinting. A call center system or third-party analytics system includes a server that transmits notifications to a caller device that includes an interactive hyperlink or URL to a particular webpage. When a browser of the caller device navigates to the webpage, the server captures certain types of information about the caller device and generates a browser fingerprint for the caller device. The browser fingerprint is compared against a database of registered browser fingerprints to verify that the caller device of the current call is the registered, expected caller device. The server transmits the notification via any number of communication channels and protocols, such as text messages (e.g., SMS messages, MMS messages), emails, and push notifications associated with client-side software, among others.

21 Claims, 4 Drawing Sheets

(51) Int. Cl.
  *H04L 12/66*  (2006.01)
  *H04M 3/42*  (2006.01)
  *H04M 5/00*  (2006.01)

(58) Field of Classification Search
  CPC .............. G06Q 20/40145; G06Q 20/32; G06Q 20/3821; G06F 3/0488; G06F 21/32; G06F 3/016; G06F 3/0482; G06F 3/011; G06F 3/03547; G06F 21/31; G06F 21/44; H04L 67/10; H04L 63/0876; H04L 63/0815; H04L 63/0861; H04L 67/02; H04L 67/125; H04L 2463/082; H04L 63/102; H04L 67/563; H04L 9/3247; H04L 51/224; H04L 63/0892; H04L 63/105
  USPC ................. 455/410, 411; 709/217, 213, 219; 379/114.14; 726/26
  See application file for complete search history.

(56) References Cited

U.S. PATENT DOCUMENTS

| | | | |
|---|---|---|---|
| 9,985,786 B1* | 5/2018 | Bhabbur | G06F 3/0488 |
| 10,142,464 B1* | 11/2018 | Cairns | H04W 8/18 |
| 11,915,285 B1* | 2/2024 | Gray | G06Q 30/0609 |
| 2004/0190688 A1* | 9/2004 | Timmins | H04M 3/4878 379/88.22 |
| 2006/0245576 A1* | 11/2006 | Henry | H04M 3/493 379/265.01 |
| 2014/0254778 A1* | 9/2014 | Zeppenfeld | H04M 3/5183 379/88.02 |
| 2015/0237049 A1* | 8/2015 | Grajek | H04L 67/02 726/7 |
| 2016/0050203 A1 | 2/2016 | Hefetz | |
| 2016/0164866 A1* | 6/2016 | Oberheide | H04L 63/0853 726/1 |
| 2016/0269898 A1* | 9/2016 | Kueh | H04L 63/08 |
| 2017/0310667 A1* | 10/2017 | Correa | H04W 12/065 |
| 2018/0101850 A1* | 4/2018 | Pisut, IV | G06Q 20/367 |
| 2019/0173999 A1 | 6/2019 | Hodge | |
| 2019/0182649 A1* | 6/2019 | Best | H04W 4/023 |
| 2019/0222567 A1 | 7/2019 | Caldera | |
| 2020/0134151 A1* | 4/2020 | Magi | G06F 21/35 |
| 2020/0259828 A1* | 8/2020 | Shaffer | H04L 63/0853 |
| 2020/0279255 A1* | 9/2020 | Douglas | H04L 63/0876 |
| 2021/0168147 A1* | 6/2021 | Gupta | H04L 63/08 |
| 2022/0075850 A1* | 3/2022 | Ghorbani | G06F 21/316 |
| 2022/0116392 A1* | 4/2022 | Shah | H04L 63/102 |
| 2022/0217527 A1* | 7/2022 | Naujok | H04W 12/66 |

* cited by examiner

SYSTEMS AND METHODS FOR AUTHENTICATION USING BROWSER FINGERPRINTING

TECHNICAL FIELD

This application generally relates to systems and methods for authenticating calls placed to call centers. In particular, this application relates to one or more authentication operations for authenticating callers, where at least one of the authentication operations includes a browser fingerprinting operation.

BACKGROUND

Spoofing techniques, such as Caller ID spoofing and voice spoofing, have been a pain point for enterprise call centers trying to maintain privacy and control over customers' personal information. Call centers or third-party authentication services typically reference known information about customers (e.g., customer phone number, automatic number identification (ANI) of the customer) or customer attributes (e.g., voice attributes) to verify that a caller is a registered customer. Spoofing frustrates the enterprise's ability to leverage the stored knowledge about customers (e.g., stored customer phone numbers) with confidence.

A technique for overcoming spoofing includes authentication operations that validate whether a caller is calling from an expected, registered device according to device information stored with the customer information. While device authentication is often effective against Caller ID spoofing, device authentication is not always sufficient against spoofing and other types of fraud. For instance, account takeover (ATO) fraud occurs when a bad actor originates a call from a device that is registered with the system (e.g., same phone number). In SIM-swap scams, a fraudster registers as an account holder and activates a new line of service for a SIM or replaces an existing line of service connected to the SIM with another SIM in the fraudster's control, thus taking over the phone and being able to "legitimately" impersonate the original account owner.

In some cases, an enterprise employs a "stepped-up" approach to authentication, performing a second-tier authentication, by dispatching a one-time personal identification number ("one-time PIN") or one-time password (OTP) to an endpoint associated with the customer account information (e.g., mobile phone number, customer email). A fraudster could intercept the OTP by, for example, performing a man-in-the-middle attack or otherwise intercepting the OTP communication between the call center system and the client device. For instance, the bad actor could swap the client device's SIM card (e.g., SIM-swap), allowing the bad actor to access a text message containing the OTP, and permitting the bad actor to relay over the phone or through a response prompt the OTP. The fraudster could also eavesdrop on the connection or conduct social engineering on a victim (e.g., registered customer, call center agent) to retrieve or intercept the OTP.

Rather than reading or sending an OTP to the caller, the system could employ a device print or biometrics. Biometrics might be impracticable, unwieldy, resource intensive, or otherwise unavailable. Another conventional technique for increasing confidence in authentication operations is to push a login notification prompt to a client side application, text message, or email address regarding a login attempt that previously occurred. For example, a caller or another person can receive a login notification prompt via a push notification to a client side application, text message, or email, indicating, for instance, "a login attempt to access your account just occurred, please call us or respond to this login notification prompt immediately if this was not you." But these login notifications might be unavailable for the particular caller or user and often do not capture device information for both caller and device authentication.

A possible technique for gathering identifying information about a registered device involves client-side browser cookies. For instance, when enrolling the registered device at a certain webpage of the system, the registered device downloads the cookie. The cookie, for example, reports information about the registered device to the call center system or responds to certain requests from the call center system. But while cookies can gather and report device or browser information that could boost authentication confidence, cookies are becoming obsolete or untenable in view of technological evolution and legal frameworks targeting privacy concerns.

What is needed is another means of authenticating callers and caller devices. In particular, what is needed is a means for capturing uniquely identifying information about caller devices, where the information about the devices operates as an additional factor of authentication when authenticating callers who contact a call center system.

SUMMARY

Fingerprinting software is replacing cookies for identifying devices visiting webpages. Fingerprinting software generates a unique fingerprint for a device based on multiple types of data employed by the device when visiting the webpage. The fingerprinting software can generate "browser fingerprints" or "device fingerprints" that uniquely identify a particular browser or device. Although the terms "browser fingerprints" and "device fingerprints" refer to slightly different types of fingerprints, the art frequently often uses these terms interchangeably. As used herein, the terms "fingerprint," "browser fingerprint," and "device fingerprint" refer to the resulting outputs of similar computer-executed fingerprinting processes described below. For ease of description, the term "browser fingerprint" is used to describe the embodiments below. Given that browser fingerprinting is becoming popular and more sophisticated as a mechanism for capturing client-side information, call center systems could employ browser fingerprinting as a second factor of authentication. The problem is that fingerprints are typically generated only when a device navigates to a particular uniform resource locator (URL) or web address. What is needed is a way to incorporate browser fingerprinting into call center systems and the call management flow to derive and employ browser fingerprints as a second factor of authenticating callers.

Disclosed herein are systems and methods capable of addressing the above-described shortcomings and may also provide any number of additional or alternative benefits and advantages. Embodiments described herein provide for authenticating callers using browser fingerprinting as a second factor of authentication. A call center system or third-party analytics system includes a server that transmits notifications to a caller device that includes an interactive hyperlink or URL to a particular webpage. When a browser of the caller device navigates to the webpage, the server captures certain types of information about the caller device and generates a browser fingerprint for the caller device. The browser fingerprint is then compared against a database of registered browser fingerprints to verify that the caller device of the current call is the registered, expected caller device. The server transmits the notification via any number of communication channels and protocols, such as text messages (e.g., SMS messages, MMS messages, RCS messages, Apple® messaging), instant message (e.g., IM/IRC: Slack, Skype, XMPP), emails, and push notifications associated with client-side software, among others.

In an embodiment, a computer-implemented method comprises receiving, by a computer, an inbound call associated with a caller device; transmitting, by the computer, a notification to the caller device, the notification including machine-executable instructions instructing the caller device to access a webpage configured to obtain device-identifying data associated with the inbound client device; obtaining, by the computer, a browser fingerprint associated with the caller device based upon the device-identifying data; and executing, by the computer, an authentication operation to authenticate the caller device using the browser fingerprint obtained via the webpage for the inbound call.

In another embodiment, a system comprises a webserver and a server. The webserver comprises a non-transitory memory and a processor, the memory configured to store machine-readable code of a webpage, and the processor configured to obtain device-identifying data associated with a caller device according to the code of the webpage. The server comprises a processor configured to receive an inbound call associated with the caller device; transmit to the caller device a notification comprising machine-executable instructions instructing the caller device to access the webpage; obtain a browser fingerprint associated with the caller device based upon the device-identifying data obtained by the webserver; and execute an authentication operation to authenticate the caller device for the inbound call using the browser fingerprint obtained using the device-identifying data.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
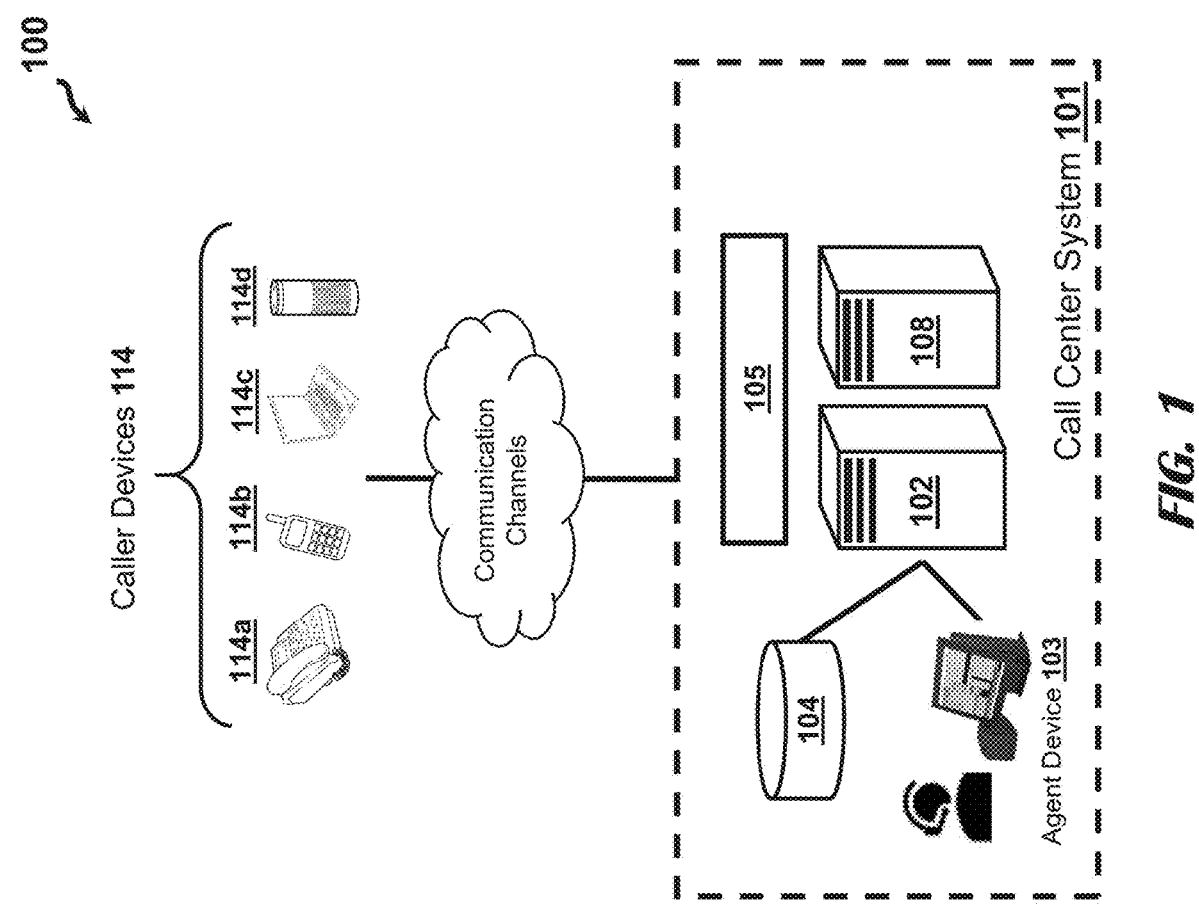
FIG. 1 shows components of a system for receiving and servicing inbound calls, according to an example embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Described herein are systems and methods for authenticating calls to call centers. When authenticating inbound calls, the systems employ browser fingerprinting as an authentication factor, in addition or as an alternative to other authentication factors. Modern web browsers (client) provide specific information about the client and client device to webservers when the client accesses webpages hosted by the webserver. The specific information includes requests or instructions regarding the requirements for the client or client device to correctly display the webpage and execute the scripting of the webpage. This specific information typically encompasses general attributes about the client and the client device, such as the client (e.g. name of the browser), the orientation of the display (e.g., portrait or landscape), and the resolution of the display (e.g., 1440× 720), among others. Taken together, this specific information becomes device-identifying data, essentially creating building blocks for so-called "browser fingerprints" or "device fingerprints." These browser fingerprints improved significantly over time, including the ability to stabilize a captured fingerprint even if the browser version changes, increasing confidence in both accuracy and uniqueness.

The call center system includes a server that collects call data for an inbound call and communicates notifications to a caller device. The notification includes a hyperlink for display on a graphical user interface (GUI) of the caller device. When the caller actuates the hyperlink, a browser program accesses the URL of a webpage hosted by the call center. The webserver service (e.g., Apache, MS IIS) that hosts the webpage executes scripting code that requests or identifies certain types of device-identifying data used for generating the browser fingerprint. After the webserver service collects the device-identifying data, the webserver service forwards the data to fingerprinting software (e.g., FingerprintJS, ClientJS), which is executed by the server or any other computing device of the call center system. The fingerprinting software ingests the device-identifying data to generate the browser fingerprint for the caller device, which the server's authentication operation uses to compare against a database of registered browser fingerprints for registered devices.

The embodiments described herein describe the authentication operations performed by a computing device (e.g., server) of a call center system. In some embodiments, however, a computing device of a third-party analytics system performs the authentication operations on behalf of the call center. In such embodiments, the server of the analytics system transmits an authentication indicator to an agent device or other device of the call center system. Further, in some embodiments, a client device (sometimes referred to as a "caller device") performs one or more authentication operations described herein. Client-side biometrics authentication operations employ client-side hardware (e.g., camera, microphone, touchpad) to evaluate the biometrics data on the client-side to aid authentication and offload some processing obligations. The client device then transmits the authentication results to a computing system of the call center or the third-party analytics system. For example, where the client device is a smart phone, then the client device performs a local TouchID or FaceID authentication operation and informs the computing system of successful authentication in response to a request from the computing system. Additionally or alternatively, the client device performs the local biometrics authentication operation, and the biometric authentication results are collected by the computing system via the fingerprinting-webpage of the computing system.

It should be appreciated that "call data," as used herein, includes data that could be characterized as metadata or data, based on various data specifications governing, for example, the devices, networking protocols, and telecommunications protocols, among others. A server may extract (some or all of) the call data from an audio signal and streaming data packets for a phone call, directly from a caller device or via a device of a customer call center. The call data may then be stored into a database for later retrieval and processing. The call data may include an audio signal containing a recording of some or all of the audio that was streamed or otherwise received from the caller device and various types of metadata fields (e.g., phone number, call timestamps, associated protocols, carrier information). A server performing authentication operations references the call data to determine whether authenticating data (e.g., credentials) submitted by an end-user (e.g., inbound caller) matches to a known end-user (e.g., registered caller).

In some embodiments, the authentication operations include a consensus model based on prior authentication data (e.g., biometrics data, device fingerprint, browser fingerprint, voiceprint, deviceprint, user credentials) stored in non-transitory machine-readable storage medium of any number of computing devices. A computing device performing an authentication operation generates and transmits a plurality of requests for samples of the prior authentication data from the corresponding computing devices and compares the samples against the authentication data received from a client device. The client device is authenticated when the inbound authenticating data matches or otherwise satisfies a threshold number (e.g., a consensus threshold) of samples containing the prior authentication data. For example, the computing device compares a browser fingerprint obtained for a caller device, via a fingerprinting-webpage, against a plurality of prior browser fingerprints stored in a plurality of memories. The computing device authenticates the caller device in response to determining that the browser fingerprint matches to the consensus threshold number of prior browser fingerprints.

FIG. 1 shows components of a system 100 for receiving and servicing inbound calls, according to an example embodiment. The system 100 comprises a call center system 101 of an enterprise organization (e.g., company, government entity, university) and caller devices 114 (e.g., landline phone 114a, mobile phone 114b, caller computing device 114c, edge device 114d). The call center system 101 includes analytics servers 102, analytics databases 104, call data capture appliances (sometimes referred to as data taps 105), and agent devices 103. Embodiments may comprise additional or alternative components to, or omit certain components from, the components of FIG. 1, and still fall within the scope of this disclosure. It may be common, for example, for the call center system 101 to forward call data for inbound calls to a call analytics system that perform the various authentication operations of the authentication server 102 on behalf of the call center system 101. Embodiments may include or otherwise implement any number of devices capable of performing the various features and tasks described herein. For example, the FIG. 1 shows the authentication server 102 being a distinct computing device from the enrollment database 104, but in some embodiments, the enrollment database 104 integrates into the authentication server 102.

Various hardware and software components of one or more public or private networks may interconnect the various components of the system 100. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the caller devices 114 may communicate with callees receiving the inbound call (e.g., call center system 101) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as carriers, exchanges, and networks, among others.

The caller device 114 may be any communications or computing device that the caller operates to place a call to the call routing destination (e.g., call center system 101). Non-limiting examples of caller devices 114 may include landline phones 114a and mobile phones 114b. The caller device 114 is not limited to telecommunications-oriented devices such as telephones, but may include other types of devices for telephonic or video communications. As an example, the caller device 114 may include any electronic device comprising a processor and/or software configured to implement voice-over-IP (VoIP) telecommunications or other voice-based communication via the Internet. Non-limiting examples of such caller devices 114 include caller computing devices 114c (e.g., personal computers) and edge devices 114d (e.g., Internet of Things (IoT) devices). The edge device 114d may be an electronic IoT device (e.g., voice assistant device, "smart device," "smart appliance") comprising a processor and/or software capable of performing communications via the Internet. In some embodiments, the edge device 114d includes hardware and software that utilizes the telecommunications functions of a telecommunications device (e.g., mobile phone 114b) that is "paired" or otherwise networked to the edge device 114d.

The call center system 101 represents a network infrastructure comprising physically and logically related software and electronic devices, managed or operated by the enterprise organization. The various components of the call center system 101 are connected with each other via hardware and software components of any number of private and public networks. Examples of such networks include, but are not limited to, LAN, WLAN, MAN, WAN, and the Internet, among others. The components of the call center system 101 likewise comprise hardware and software functions to communicate over these networks in accordance with various communication protocols, such as TCP/IP, UDP, and IEEE communication protocols, and others.

The call center system 101 comprises various hardware and software components for receiving, managing (e.g., routing, queuing), and servicing the inbound calls from the caller devices 114. The call center system 101 comprises multiple communication channels for receiving the inbound calls, where the communication channels include various hardware and software components that enable callers to contact the call center system 101. The callers use various types of caller devices 114 or various types of software programs, and each of the channels correspond to the caller device 114 and software application employed by the caller to place the call. For example, a channel may include cellular telecommunications. In this example, the caller operates the mobile phone 114b to place a telephone call via a cellular carrier and telecommunications network. As another example, a channel may include VoIP calls of a particular software application. In this example, the caller operates the mobile phone 114b to place a VoIP call via the Internet (rather than a cellular telephone call). The call center system 101 comprises the hardware components (e.g., trunk, exchange, server, telecom switch, IP switch) and software components for receiving the inbound calls via the various channels.

The call center system 101 includes one or more computing devices that execute call management software. The call management software receives, routes, and queues each of the calls received through the various communication channels. The call management software further receives and stores certain types of call data and forwards the inbound call and call data to agent devices 103. The agent devices 103 likewise execute call management software that presents information to an agent-user about the inbound call and the caller, allowing the agent to review the information about the call and service the caller or perform certain authentication actions. The call center system 101 connects the call to an agent device 103 and the presents the call data to the agent via a graphical user interface (GUI) of the agent device 103 or another computing device operated by or accessible to the agent. In some embodiments, the call management software includes interactive voice response (IVR) software, as executed by an IVR server 108, which routes the inbound calls to certain agents or servicing software based upon the caller's spoken or inputted responses to predetermined menu prompts.

The call center system 101 comprises one or more devices that capture and store various types of call data (e.g., audio signal data, communications protocol metadata) related to the caller and the caller device 114. These data capture devices include the authentication server 102, the IVR server 108, the agent devices 103, and data taps 105, among others. The call data is stored on the particular device or into an enrollment database 104. Using the call data of current and historic calls, the authentication server 102 performs various operations for authentication of the caller device for the inbound call, including the authentication operations described herein.

The call center system 101 optionally comprises one or more data taps 105, which are computing devices for collecting and storing the call data associated with the inbound calls received from the calling devices 114 through certain communication channels. The data taps 105 include any computing device having one or more processors and software, and capable of performing the various processes and tasks described herein. Each data tap 105 collects the call data for a particular communication channel and transmits the call data to other components of the call center system 101, such as the authentication server 102 or the enrollment database 104.

As an example, a particular data tap 105 monitors a telephony communications channel captures telephony traffic from telephone-oriented caller devices 114 (e.g., landline phone 114a, mobile phone 114b). The data tap 105 receives and forwards telephony data packets, received via telecommunications network(s) (e.g., carrier, exchange) from the landline phone 114a or mobile phone 114b. The telephony data packets include certain forms of the call data, such as metadata of telephony protocols or caller inputs (e.g., SS7, SIP, DTMF tones). The data tap 105 forwards the call data or telephony data packets to, for example, the enrollment database 104, agent device 103, or authentication server 102.

As another example, the particular data tap 105 for monitoring VoIP traffic captures the Internet traffic data packets (e.g., TCP/IP data packets) from caller devices 114 communicating audio signal data via the Internet (e.g., mobile phone 114b, caller computer 114c, edge device 114d). As before, the data tap 105 receives and forwards the data packets, received via the computing network(s) (e.g., Internet) from the caller computing device 114c or edge device 114d. The data packets include certain forms of the call data, such as data associated with software or protocols (e.g., VoIP, TCP/IP, codecs, software brand). The data tap 105 forwards the call data or the data packets to, for example, the enrollment database 104, agent device 103, or authentication server 102.

The call center system 101 prompts callers to input certain information that devices of the call center system 101 ingest to perform various processes, such as an IVR server 108 referencing the inputted information to route the call or an authentication server 102 referencing the inputted information to execute authentication operations. In some cases, an agent verbally requests information from the caller and manually enters the caller's responses into a GUI of the agent device 103. The agent device 103 transmits the information of the caller's responses to the authentication server 102 to perform, for example, the authentication operations. In some cases, the call center system 101 comprises the IVR server 108 that transmits automated audio or GUI prompts to the caller and caller device 114 via the communication channel. For instance, the IVR server 108 sends prompts to the caller device 114 requesting the caller enter or speak certain information about the caller (e.g., credentials, caller data) or the desired service. The IVR server 108 connects the caller to a particular routing destination, which includes the appropriate agent, information, or service, based upon the caller's responses, forwarding the call and the inputted information (and any other information stored in the enrollment database 104) to the agent device 103 or to the authentication server 102. The IVR server 108 can also capture and store call data about the caller or caller device 114 into the enrollment database 104.

The IVR server 108 executes software processes for interacting with the end-users through the various communications channels. The processes may include, for example, routing calls to the appropriate routing destination (e.g., agent devices 103) based on the inbound caller's IVR inputs (e.g., comments, instructions, DTMF inputs) submitted during the inbound call. The IVR server 108 or authentication server 102 can capture, query, or generate various types of information about the inbound audio data, the caller, and/or the end-user device 114 and forward the information to the agent device 103. A GUI of the agent device 103 displays the information to the particular agent who received the inbound call from the IVR server's 108 routing. In some implementations, the IVR server 108 also transmits the information about the inbound call to the authentication server 102 to perform the authentication operations and various analytics processes on the call data.

The authentication server 102 of the call center system 101 includes any computing device comprising one or more processors and software, and capable of performing the various processes and tasks described herein. The authentication server 102 performs various operations on the call data for the inbound call, including executing the authentication operations. Although FIG. 1 shows only a single authentication server 102, the authentication server 102 may include any number of computing devices. In some embodiments, the authentication server 102 comprises multiple computing devices that operate in a distributed or cloud-computing configuration and/or in a virtual machine configuration.

The authentication server 102 performs the authentication operations described herein using the call data (e.g., audio recordings, protocol metadata, device data, caller data) from various data sources, such as the enrollment database 104, agent device 103, data tap 105, the IVR server 108, and caller device 114. The server receives various types of call data associated with the inbound call, such as audio data (e.g., audio recording, low-level audio features), device data, communications data (e.g., header fields, protocol metadata), user data (e.g., user identifiers, password or PIN, account information), and application data (e.g., browser data), among others.

The authentication server 102 comprises, or is in networked communication with, the enrollment database 104 of the call center system 101. The authentication server 102 is similarly in networked communication with one or more other devices of the call center system 101, including the agent device 103, data tap 105, and the IVR server 108, where the authentication server 102 directly receives the call data from such devices or indirectly via another device. For example, the authentication server 102 receives the call data entered by the agent directly from the agent device 103. As another example, the authentication server 102 receives the call data from the IVR server 108 indirectly via the agent device 103. The authentication server 102 parses or extracts certain types of call data from the call data received from the various data source devices, or the data source devices parse and extract certain types of call data before forwarding or storing the call data.

The authentication server 102 performs one or more authentication operations using the current and historic call data for the current inbound call and prior calls. If performing multiple authentication operations, then the authentication server 102 may perform the authentication operations simultaneously or near-simultaneously, or perform the authentication operations in a "stepped-up" approach whereby the authentication server 102 performs a first authentication operation to permit the call to be routed to a first routing destination (e.g., first service operation, first agent device) and then performs a second authentication operation to permit the call to be routed to a second (more secure or sensitive) routing destination (e.g., second service operation, second agent device). The authentication server 102 or the IVR server 108 includes programming that indicates which of the potential routing destinations (e.g., services, types of information, agent devices 103) are sensitive destinations that requires elevated security operations, such as a second-tier authentication operation. For example, the authentication server 102 or the IVR server 108 determines that the routing destination for the inbound call, according to the IVR inputs or the caller's verbal requests, is a sensitive destination (e.g., open new account, wire transfer) that requires the authentication server 102 to execute the fingerprint authentication operation to authenticate the inbound call using the inbound browser fingerprint.

For ease of description, the authentication server 102 executes webserver services (e.g., Apache, MS IIS) for hosting webpages and web-based applications and executing coding or scripts associated with particular webpages. In other embodiments, however, the webserver services are hosted on one or more separate computing devices such as servers (often referred to in the art as "web servers"). The authentication server 102 hosts the webpage having a URL included in a notification sent to the caller device 114. The webpage coding, executed by the webserver services, instructs the authentication server 102 to gather or extract the device-identifying data from the data traffic between the caller device's 114 browser and the webserver service. The authentication server 102 executes the one or more authentication operations to authenticate the caller, which includes the fingerprinting software that generates the inbound browser fingerprint for the caller device 114. The authentication server 102 generates the inbound browser fingerprint using the device-identifying data received via the webpage.

In performing the browser fingerprinting operation, the authentication server 102 transmits the notification to the caller device 114 via a communication channel corresponding to the notification's data format (also referred to as "type of notification"). The notification includes any format capable of presenting a URL or interactive hyperlink at the GUI of the caller device 114, where the hyperlink invokes a browser of the caller device 114 and directs the browser to the URL of the webpage. Non-limiting examples of the notification's format includes a text message (e.g., SMS message, MMS message, RCS, Apple® messaging), an email, an instant message (e.g., IM/IRC: Slack, Skype, XMPP), or a push notification for a locally executed software program of the caller device, or the like. The authentication server 102 uses the communication channel that corresponds to the particular type of notification transmitted. For instance, the authentication server 102 transmits the text message via the cellular telephony network or transmits the email via the Internet (TCP/IP), and so on. In some cases, the authentication server 102 is pre-configured to transmit the notification via a defined or default set of one or more communication channels, where the notification comprises the corresponding format. In some cases, the authentication server 102 queries the enrollment database 104 to identify one or more preferred communication channels for the particular caller.

The notification includes the hyperlink URL that, when actuated by the caller, directs the caller device 114 to the webpage that obtains various types of device-identifying data (e.g., browser data, device data, user data) associated with the caller device 114. In some instances, the operating system of the caller device 114 executes the browser software of the caller device 114 and passes the URL to the browser. The browser, in turn, navigates to the URL for the webpage by requesting the webpage data according to the various protocols (e.g., HTTP, TCP/IP). In some instances, caller manually executes the browser software of the caller device 114 and manually enters the URL indicated in the notification into a navigation interface element of the browser software.

The enrollment database 104 contains data records of registered callers containing various types of data associated with the registered callers and registered caller devices 114. The enrollment database 104 is hosted on any number of computing devices comprising a processor, device hardware, and machine-readable software and capable of performing the various processes and tasks described herein. The enrollment database 104 is hosted on one or more computing devices of any kind (e.g., server, personal computer, laptop computer, tablet computer). For ease of description, the enrollment database 104 stores data records for prior calls, including the various types of call data, caller device 114 history, and authentication outcomes, though other embodiments include separate devices that host the data records for prior calls.

In operation, the authentication server 102 updates the enrollment database 104 to enroll new callers and new registered caller devices 114 and updates the call records of inbound calls and prior calls. When a new caller registers with the call center system 101 (e.g., registers as a new customer with the enterprise), the authentication server 102 or the agent device 103 of an intake agent receives personal information about the caller (e.g., name, DOB, SSN, username credential, password credential) and the agent device 103 (or other computing device) receives and stores registered device information. The intake agent receives the personal information from the caller verbally; or the authentication server 102 or the agent device 103 receives the personal information from the caller device 114 via GUI inputs at a registration webpage hosted by the authentication server 102. In addition, the authentication server 102 generates a new registered browser fingerprint for the new registered caller device 114 at the registration webpage, and stores the new registered browser fingerprint into the enrollment database 104. In some embodiments, the registration process of the authentication server 102 includes receiving caller biometric data (e.g., voice audio sample, facial scan, retinal scan, fingerprint scan) for the registered caller and generating a registered biometrics credential (e.g., voiceprint, physical fingerprint, face print, retinal print). When later executing the authentication processes (e.g., authenticating inbound caller's credentials, authenticating inbound caller's biometrics data, authenticating inbound browser fingerprint), the authentication server 102 queries the data records of the enrollment database 104 for the registered authentication data matched to the authentication data submitted by the inbound caller or otherwise corresponding to the registered caller that the inbound caller purports to be.

The database records in the enrollment database 104 include various types of data about registered callers and registered devices, such as caller identification information and device identification information. The data records for the registered caller may indicate other information employed by the authentication server 102 for authentication processes, such as preferred mechanisms for communication (e.g., email, text message, push notifications) and the preferred communications channels to contact the registered caller device 114 when transmitting requests for certain information or sending notifications to the authenticate.

The agent device 103 of the call center system 101 is a computing device allowing personnel-users (e.g., call center agents, admin users, fraud analysts, intake agents) of the call center system 101 to perform various administrative tasks or caller-prompted services. The agent device 103 may be any computing device comprising a processor and software, and capable of performing the various tasks and processes described herein. Non-limiting examples of the agent device 103 may include a server, personal computer, laptop computer, tablet computer, or the like. The IVR server 108 determines the routing destination for the inbound call based upon the IVR inputs from the caller. In some cases, the routing destination includes a particular agent who can help the caller with the caller's particular needs, and the IVR server 108 routes the inbound call to the agent device 103. The agent device 103 receives and displays some or all of the call information associated with the inbound call routed by the IVR server 108. For instance, the authentication server 102 or the IVR server 108 transmits the call information to the agent device 103, such as an authentication status of the current inbound call (e.g., first-tier, second-tier, failed, successful), the caller's personal information, requested services or information, and the like.

In some cases, the authentication server 102 or IVR server 108 reroutes the call to the agent device 103 of a fraud analyst, when the inbound caller fails certain authentication operations. The agent device 103 of the fraud analyst receives and displays some or all of the information associated with the inbound call, allowing the fraud analyst to examine, evaluate, and mitigate fraud attempts. The fraud analyst may further attempt another authentication operation in which the fraud analyst accesses the enrollment database 104 for further information about the inbound caller and the purported registered caller. Additionally or alternatively, the agent device 103 enables the admin user of the call center system 101 to configure operations of devices of the call center system 101.

Figure 2:
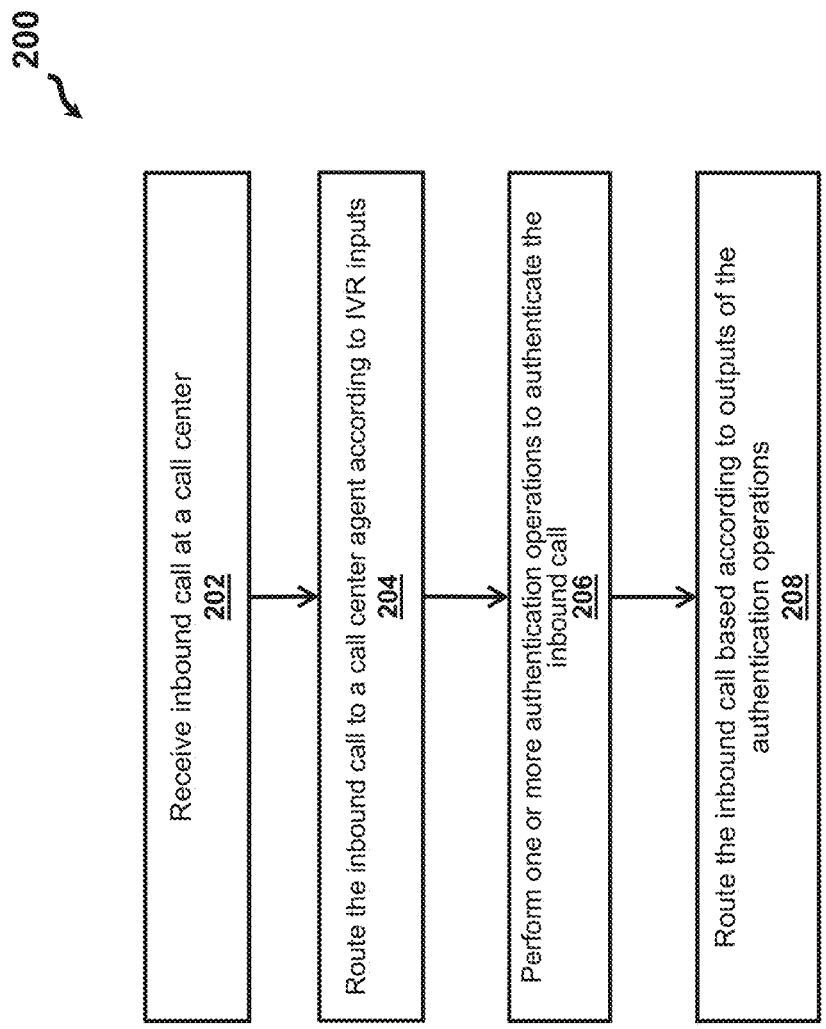
FIG. 2 shows execution steps for a method of managing and authenticating inbound calls received at a call center.

FIG. 2 shows execution steps for a method 200 of managing and authenticating inbound calls received at a call center. A server device of a call center system (or other call analytics system) performs the method 200, though embodiments are not limited to a single server. Embodiments may include any type of computing device (e.g., tablet, personal computer, laptop computer) that perform the operations described herein, and any number of computing devices may perform the operations. Moreover, other embodiments include additional or alternative steps to, or omit steps from, the steps of the example method 200 and still fall within the scope of this disclosure.

In step 202, the server receives call data associated with an inbound call, as received at the call center via a particular communication channel. A caller operates a caller device to place the inbound call to the call center, and one or more communications networks and carriers route the call to the call center system according to the hardware and protocols employed by the communication channel.

In step 204, the server routes the inbound call to a call center agent according to IVR inputs received from the caller device. The server executes IVR software that answers and connects to the inbound call. The IVR software transmits IVR prompts to the caller device and receives the caller responses, which could be spoken responses, DTMF keypad tones, or any other format employed by IVR software. The IVR software converts the caller responses into the IVR inputs and determines how to route the inbound call based upon the IVR inputs. The server routes the inbound call to the agent, connects the caller device to the agent device, and presents call data to a GUI of the same or different agent device.

In step 206, the server performs one or more authentication operations to authenticate the inbound call. In the example method 200, at least one of the authentication operations includes browser fingerprinting, though the server may perform additional authentication operations.

The additional authentication may vary depending upon the information or services requested by the caller.

In some circumstances, the IVR software determines that the server must perform one or more authentication operations. For example, when the caller's IVR inputs indicate that the caller would like to discuss certain services with an agent, the IVR software instructs the server to perform a first authentication operation to verify the caller's identity or otherwise register a new caller. The first authentication operation prompts the caller to input certain caller information (e.g., name, DOB, SSN, password, PIN) that the server references in a database record to verify the caller's identity. This form of authentication is susceptible to exploitation by bad actors who could overcome or bypass this first authentication operation, though the risk of harm is low and the first authentication operation will suffice. For operations that are more serious (e.g., accessing or updating the caller's account), the server employs a second factor of authentication and performs a second authentication operation. The server performs the second authentication operation contemporaneous to performing the first authentication operation or in stepped-up approach.

In step 208, the server routes the inbound call to a routing destination based upon the caller's IVR inputs or spoken requests and in accordance with outputs of the authentication operations. For instance, if the caller fails the authentication operations, then the server routes the inbound call to one or more mitigation destinations or registration destinations or the server drops or terminates the inbound call. If the caller satisfies the authentication operations, then the server routes the inbound call to the caller's desired destination.

Figure 3:
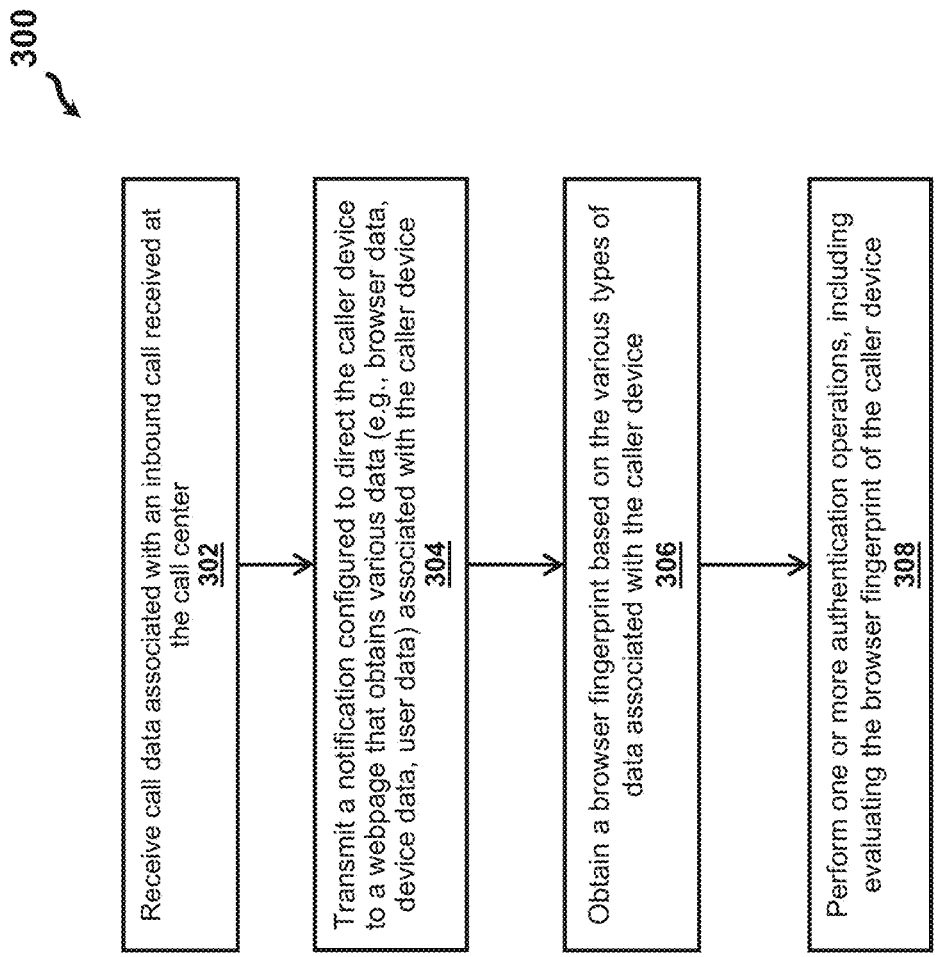
FIG. 3 shows execution steps for a method of managing and authenticating inbound calls received at a call center.

FIG. 3 shows execution steps for a method 300 of managing and authenticating inbound calls received at a call center. A server device of a call center system (or other call analytics system) performs the method 300, though embodiments are not limited to a single server. Embodiments may include any type of computing device (e.g., tablet, personal computer, laptop computer) that perform the operations described herein, and any number of computing devices may perform the operations. Moreover, other embodiments include additional or alternative steps to, or omit steps from, the steps of the example method 300 and still fall within the scope of this disclosure.

In step 302, the server receives call data associated with an inbound call, as received at the call center via a particular communication channel. A caller operates a caller device to place the call to the call center, and one or more communications networks and carriers route the call to the call center system according to the hardware and protocols employed by the communication channel. The server begins performing one or more authentication operations. The authentication operation performed in the method 300 includes a browser fingerprinting operation.

In step 304, the server transmits a notification configured to direct the caller device to a webpage that obtains various types of data (e.g., browser data, device data, user data) associated with the caller device. The notification includes any format for presenting a hyperlink that directs a browser of the caller device to a web address of the webpage. Non-limiting examples of the notification include an SMS message, MMS message, email, push notification to a locally executed software program of the caller device, or the like. The caller device receives the notification and a GUI of the caller device presents the interactive hyperlink to the caller.

The server (or other device of the call center system) executes web server software that hosts the webpage and the underlying code of the webpage (e.g., HTML, JavaScript, PHP). When the caller actuates the hyperlink of the notification, the browser of the caller device transmits a request (e.g., HTTP GET) to the webserver according to the web address of the hyperlink. The browser of the caller device executes the webpage code, which includes machine-executable instructions that instruct the caller device to collect and transmit various types of data (e.g., device data, browser application data) to the server.

As an example, the caller device transmits device data that includes a type or version of an operating system of the caller device, an IP address of the caller device, a MAC address of the caller device, the orientation of a display (e.g., portrait, landscape), the resolution of the display (e.g., 1440×720), among other types of device data. The caller device queries the operating system or non-transitory memory location of the caller device to determine the device data. As another example, the caller device transmits browser data that includes a type or version of the browser application, a combination of extensions or plugins to the browser, In step 306, the server (or a separate webserver) obtains a browser fingerprint based on the various types of data (e.g., device data, browser data) associated with the caller device. The server executes software programming that generates a browser fingerprint (e.g., FingerprintJS, ClientJS, Castle®, Shield®) for uniquely identifying the caller device using portions of the call data received from the caller device.

In some cases, the server's software programming extracts or infers certain types of data for the caller device. For example, the server can resolve the caller device's operating system, screen size, screen orientation, or display aspect ratio, among other types of information, based upon JavaScript code that responds to or observes browser queries requesting webpage instructions for formatting (e.g., CSS) or media presentation. The fingerprinting software is not limited to the examples mentioned here, but may extract any number of data types for generating the inbound fingerprint for the caller device.

In step 308, the server performs one or more authentication operations, including evaluating the browser fingerprint of the caller device. The server compares the browser fingerprint against one or more registered (or known) browser fingerprints stored in a database. The server authenticates the caller device when the inbound browser fingerprint matches to a registered browser fingerprint within a threshold level of error.

In some embodiments, prior to, or in conjunction with, evaluating the inbound browser fingerprint, the server executes a first authentication operation (e.g., verifying caller credentials) using caller credentials (e.g., caller identifier, password, PIN) as a first authentication factor. In such embodiments, the server evaluates the browser fingerprint as a second authentication operation that references the inbound fingerprint as a second authentication factor.

Figure 4:
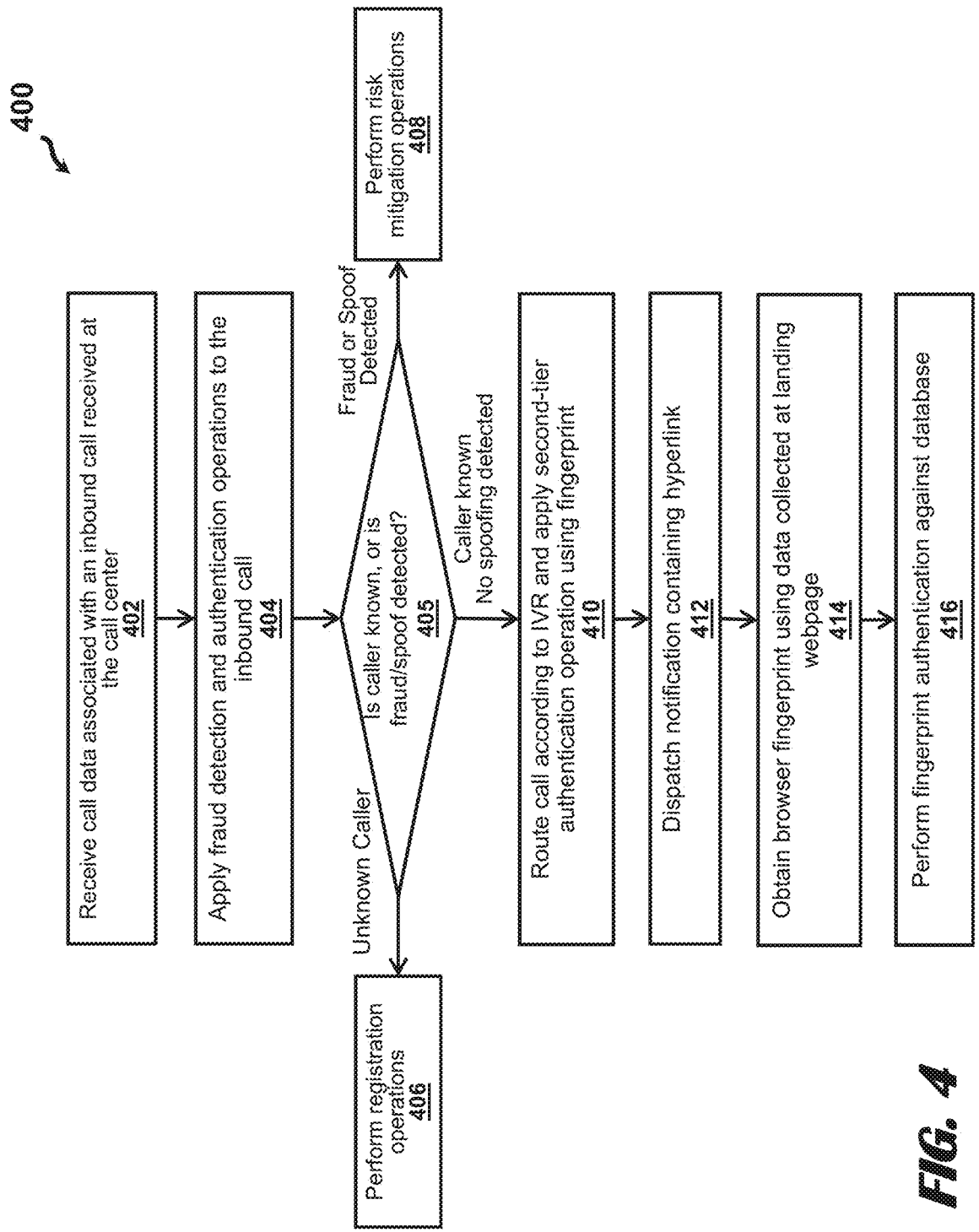
FIG. 4 is a flowchart showing steps of a call flow for a method of managing and authenticating inbound calls received at a call center.

FIG. 4 is a flowchart showing steps of a call flow for a method 400 of managing and authenticating inbound calls received at a call center. A server device of a call center system (or other call analytics system) performs the method 400, though embodiments are not limited to a single server. Embodiments may include any type of computing device (e.g., tablet, personal computer, laptop computer) that perform the operations described herein, and any number of computing devices may perform the operations. Moreover, other embodiments include additional or alternative steps to, or omit steps from, the steps of the example method 400 and still fall within the scope of this disclosure.

In step 402, the server receives call data associated with an inbound call, as received at the call center via a particular communication channel. A caller operates a caller device to place the call to the call center, and one or more communications networks or telecommunications carriers route the call to the call center system according to the hardware and protocols employed by the communication channel.

In step 404, the server applies one or more security operations to the inbound call, including fraud detection operations and authentication operations. The authentication operations confirm whether the particular caller or caller device is registered (or known) and whether the caller or caller device are, indeed, as purported. The fraud detection operations evaluate various types of data received from the caller device during the call to determine a (fraud or spoof) risk score that indicates the likelihood that the inbound call is a source of fraud or a spoofing attempt.

When the server executes a first authentication operation, the server receives a set of asserted of credentials from the caller. The caller submits the credentials, verbally or via keypad entries, in response to IVR prompts, or the caller provides the credentials verbally in response to the agent's verbal prompts. The credentials include one or more identifiers that indicate a purported identity of the caller and one or more passcodes (e.g., password, PIN, OTP). The server determines whether the caller's entered credentials match registered credentials stored in a database.

The fraud detection operations apply various machine-learning models or rules-based algorithms (sometimes called "handcrafted" or "hard-coded" algorithms) on certain types of call data to generate the risk score. The fraud detection operations include, for example, evaluating whether the caller's voice matches a registered voice model (sometimes called a "voiceprint"), or evaluating the non-speaker characteristics of the call data (e.g., geographic origin, phone number, codec) to determine whether the combination of such characteristics indicate a likelihood of fraud or spoofing. Non-limiting examples of such fraud detection operations are described in U.S. application Ser. No. 15/294,538, entitled "Fraud Detection in Interactive Voice Response Systems," filed Oct. 14, 2016; U.S. application Ser. No. 16/992,789, "Caller Verification Via Carrier Metadata," filed Aug. 13, 2020; and U.S. Application No. U.S. Ser. No. 15/910,387, entitled "Method and Apparatus For Detecting Spoofing Conditions," filed Mar. 2, 2018; and U.S. application Ser. No. 17/155,851, entitled "Robust Spoofing Detection System Using Deep Residual Neural Networks," filed Jan. 22, 2021, each of which is incorporated by reference in its entirety.

In some embodiments, the server forwards the call data to other computing devices configured to perform the security operations. For instance, an analytics server functions as a fraud detection system that receives certain call data from the server, executes anti-fraud software programming that performs the fraud detection operations, and returns a fraud likelihood indicator or fraud risk score to the server.

In determination step 405, the server determines whether the caller is a registered (or known) caller and whether the inbound call is a spoofing attempt. The server executes the fraud detection operations and the authentication operations using the call data or caller responses, and generates the corresponding risk scores. If the caller indicates (via the caller's responses) that he/she is a new user or customer, or indicates that he/she does not have credentials, then the server determines that the caller is unknown. If the caller's credentials fail the first authentication operation, or if the risk score fails a risk threshold score, then the server determines that the call is potentially a source of fraud or spoofing (i.e., fraud or spoofing is detected).

In step 406, the server performs one or more registration operations, when the server determined (in step 405) that the caller is unknown. The database stores caller information into a new data record for the registered caller. The caller information includes, for example, caller identifiers (e.g., name, username, account information, password/PIN), the ANI or phone number, geography, IP address, MAC address, accelerometer data, audio data (e.g., voiceprint), video data, and location data (e.g., GPS data, transmission path location data), among other types of information extracted from the call data or the caller's responses to registration prompts. The server and agent devices reference the new caller data record for future security operations, analytics, or services.

In step 408, the server performs one or more risk mitigation operations, when the server detected (in step 405) fraud or spoofing. The server, for example, disconnects the call or routes to the call to a fraud analyst agent and corresponding agent device. The database stores the call data into a new data record for the fraudulent call, which the server or agent device references for future security operations. The server updates the risk detection algorithms that generated the one or more risk scores. Using the call data of the fraudulent inbound call, the server, for example, retrains the machine-learning algorithms, updates coefficient weights of handcrafted algorithms, or revises "permit lists"/"block lists," among other operations for updating the risk detection algorithms. The server (or other device of the system) may perform additional or alternative risk mitigation operations and still fall within this scope of this disclosure.

In some embodiments, if the caller merely failed to input the correct the credentials and yet the server did not detect fraud or spoofing, then the server provides the caller another opportunity for authentication. In such embodiments, the server or the agent prompts the caller for additional information about the caller, and the server or the agent device uses to perform the same authentication operation or a different authentication. For example, if the caller forgot or misstated a registered password that filed to match with the caller's password in the database, then the server or the agent prompts the caller to enter, e.g., a social security number, date of birth, or other personal information maintained in the data record of the registered caller (who the current caller purports to be).

In step 410, the server routes the inbound call according to the caller's IVR responses, when the server determined (in step 405) that the caller is registered and that the call is not a fraud/spoofing attempt. In the example method 400, the caller enters IVR responses to IVR prompts indicating that the caller intends access sensitive information (e.g., review account funds) or request a sensitive service (e.g., wire transfer, open an account). The IVR software of the server routes the call to an appropriate agent or service accordingly. The server further determines that a second-tier authentication is required, such as a browser fingerprinting authentication operation in the example method 400.

In step 412, the server dispatches a notification containing a hyperlink to the caller device. The notification includes, for example, a SMS message, MMS message, email, or push notification to the software application of the caller device, among other means for messaging device remotely. The server transmits the notification according to the particular protocols and hardware of the particular communication channel, though the server need not transmit the notification via the same communication channel the caller used to contact the call center.

The notification displays the hyperlink as a user interface element on a GUI display of the caller device. The caller actuates the hyperlink or enters into a browser navigation bar. The browser of the caller device (or another end-user device, if not the caller device) requests a webpage from a webserver hosting the webpage. For ease of description, the server hosts the webserver and the webpage in the example method 400, though any computing device could host the webserver and the webpage. The server returns the webpage to the browser, where the underlying code of the webpage includes various server-side and/or client-side software functions that request and/or transmit various types of data related to the caller device and caller browser.

In step 414, the server obtains a browser fingerprint based upon the device data received or extracted from the caller device. The server executes fingerprinting software programming that generates an inbound browser fingerprint for the caller device, where the inbound browser fingerprint uniquely identifies the caller device. The server evaluates the similarity between the inbound fingerprint against registered fingerprints stored in the database to identify a registered fingerprint that matches to the inbound fingerprint.

The server need require an absolute match between the inbound fingerprint and the registered fingerprint. For instance, the device or browser data often attenuates or changes over time, resulting in entropy between the registered fingerprint and the later-generated inbound fingerprint. To account for potentially tolerable differences, the server generates a fingerprint similarity score indicating a degree of similarity between the data of the inbound fingerprint and the data of the registered fingerprint. The algorithms weight certain data fields differently than other data fields. Less significant data fields or data fields that likely changed over time receive weights that have a comparatively lesser impact on the fingerprint similarity score, thereby allowing a degree of tolerance for changes or entropy to the registered fingerprint.

In some embodiments, another computing device executes the browser fingerprinting software, in addition or as an alternative to the server. The server and the other device communicate various types of data about the caller device and the inbound browser fingerprint using any number of APIs. The server transmits the data related to the caller device to the other device, which the other device uses to generate the inbound browser fingerprint for the caller device. The server receives back the inbound browser fingerprint to perform the next steps. In some cases, the other device is external to the infrastructure of the call center system, such that the other device is, for example, a component of an analytics system infrastructure.

In step 416, the server performs the fingerprint authentication for the caller device by comparing the inbound fingerprint for the caller device against the registered fingerprints. The server successfully authenticates the caller device when the inbound fingerprint matches to a particular registered fingerprint in the database, or when the fingerprint similarity score satisfies a fingerprint similarity threshold.

The server need not evaluate the inbound fingerprint against each registered fingerprint. In some implementations, the server references a particular type of data in the call data to query the database for the data record purportedly containing the registered fingerprint. For example, the server queries the database using the ANI of the caller device to identify the data record containing a matching ANI. If the server identifies the matching ANI, then the server retrieves the registered fingerprint from the particular data record with the matching ANI. But if the server does not identify a matching ANI, then the server queries the database using another type of data or the server determines that the fingerprint authentication fails. As another example, if the server performed a first authentication operation that successfully authenticated the caller's identity against the credentials in the data record of the registered caller, then the server references the registered fingerprint in the same data record.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    receiving, by a computer via a telephone channel, an inbound call associated with a caller device, and, during the inbound call, a request for a type of information corresponding to a destination computing device and a set of caller credentials to authenticate the caller device for the inbound call;
    determining, by the computer, the destination computing device requires a browser fingerprint for authentication according to a stored indication that a security operation for the destination computing device includes the browser fingerprint;
    in response to determining, by the computer, the set of caller credentials as received via the telephony channel fails to satisfy an authentication threshold based on a first authentication operation:
        transmitting, by the computer after receiving the inbound call and based on determining the destination computing device requires the browser fingerprint associated with the caller device for authentication, a notification to the caller device via a data channel and without terminating the telephony channel, the notification including machine-executable instructions instructing the caller device to access a webpage configured to obtain device-identifying data associated with the caller device;
        obtaining, by the computer, a browser fingerprint associated with the caller device based upon the device-identifying data; and
        executing, by the computer, a second authentication operation to authenticate the caller device using the set of caller credentials and the obtained via the webpage for the inbound call against the authentication threshold.

2. The method according to claim 1, wherein the second authentication operation includes:
    querying, by the computer, a database using the browser fingerprint, the database configured to store registered device information for a plurality of registered devices including a plurality of registered browser fingerprints corresponding to the plurality of registered devices.

3. The method according to claim 2, wherein the second authentication operation includes:
    authenticating, by the computer, the caller device as a registered device in response to the computer determining that the browser fingerprint for the caller device is a match to a registered browser fingerprint stored in the database.

4. The method according to claim 2, wherein the second authentication operation includes:
    generating, by the computer, a browser fingerprint similarity score based upon one or more similarities between the browser fingerprint for the caller device and a registered browser fingerprint for a registered device; and
    authenticating, by the computer, the caller device as the registered device in response to the computer determining that the browser fingerprint similarity score satisfies a similarity threshold.

5. The method according to claim 1, further comprising:
    receiving, by the computer, one or more inputs from the caller device indicating a routing destination for the inbound call; and
    determining, by the computer, that the routing destination for the inbound call requires the authentication operation to authenticate the caller device using the browser fingerprint.

6. The method according to claim 1, wherein the notification is at least one of a text message, an email, and a push notification for a software application associated with the caller device.

7. The method according to claim 1, wherein the notification transmitted to the caller device includes an interactive hyperlink associated with the webpage.

8. The method according to claim 1, further comprising transmitting to an agent device, by the computer, call information for a user interface of the agent device, the call information indicating an authentication status associated with the inbound call.

9. The method according to claim 1, further comprising:
    executing, by the computer, a second authentication operation to authenticate a caller associated with the inbound call using a set of caller credentials purportedly matching a corresponding set of registered credentials, including:
        authenticating, by the computer, the caller as a registered caller in response to determining that the set of caller credentials are a match to the corresponding set of registered credentials.

10. The method according to claim 1, further comprising:
    executing, by the computer, the first authentication operation to authenticate a caller associated with the inbound call using caller biometric data, including:
        receiving, by the computer, the caller biometric data from the caller device; and
        authenticating, by the computer, the caller as a registered caller in response to determining that the caller biometric data is a match to corresponding registered biometric data.

11. The method according to claim 1, wherein executing the second authentication operation includes:
    comparing, by the computer, the browser fingerprint obtained via the webpage for the inbound call against a plurality of prior browser fingerprints stored in a plurality of memories; and authenticating, by the computer, the caller device in response to determining that the browser fingerprint matches to a threshold number of prior browser fingerprints.

12. A system comprising:

a webserver comprising a non-transitory memory and a processor, the non-transitory memory configured to store machine-readable code of a webpage, and the processor configured to obtain device-identifying data associated with a caller device according to the code of the webpage; and a server comprising one or more processors configured to:
receive, via a telephony channel, an inbound call associated with the caller device, and, during the inbound call, a request for a type of information corresponding to a destination computing device and a set of caller credentials to authenticate the caller device for the inbound call; and determine the destination computing device requires a browser fingerprint for authentication according to a stored indication that a security operation for the destination computing device includes the browser fingerprint;

in response to determining the set of caller credentials as received via the telephony channel fails to satisfy an authentication threshold based on a first authentication operation:

transmit, after receiving the inbound call and based on determining the destination computing device requires the browser fingerprint associated with the caller device for authentication, via a data channel and without terminating the telephony channel, to the caller device a notification comprising machine-executable instructions instructing the caller device to access the webpage;

obtain the browser fingerprint associated with the caller device based upon the device-identifying data obtained by the webserver; and execute a second authentication operation to authenticate the caller device for the in-bound call using the browser fingerprint obtained using the set of caller credentials and the device-identifying data against the authentication threshold.

13. The system according to claim 12, further comprising a database comprising a second non-transitory memory configured to store registered device information for a plurality of registered devices including a plurality of registered browser fingerprints corresponding to the plurality of registered devices, wherein when executing the authentication operation, the server is configured to query the database using the browser fingerprint.

14. The system according to claim 13, wherein when executing the second authentication operation, the server is configured to:

authenticate the caller device as a registered device in response to the server determining that the browser fingerprint for the caller device is a match to a registered browser fingerprint stored in the database.

15. The system according to claim 12, wherein when executing the second authentication operation, the server is configured to:

generate a browser fingerprint similarity score based upon one or more similarities between the browser fingerprint for the caller device and a registered browser fingerprint for a registered device; and authenticate the caller device as the registered device in response to the server determining that the browser fingerprint similarity score satisfies a similarity threshold.

16. The system according to claim 12, wherein the server is further configured to:

receive one or more inputs from the caller device indicating a routing destination for the inbound call; and determine that the routing destination for the inbound call requires the second authentication operation to authenticate the caller device using the browser fingerprint.

17. The system according to claim 12, wherein the notification is at least one of a text message, an email, and a push notification for a software application associated with the caller device.

18. The system according to claim 12, wherein the notification transmitted to the caller device includes an interactive hyperlink associated with the webpage.

19. The system according to claim 12, wherein the server is further configured to:

transmit, to an agent device, call information for a user interface of the agent device, the call information indicating an authentication status associated with the inbound call.

20. The system according to claim 12, wherein the server is configured to:

execute the first authentication operation to authenticate a caller associated with the inbound call using a set of caller credentials purportedly matching a corresponding set of registered credentials, wherein when executing the second authentication operation, the server is configured to:

authenticate the caller as a registered caller in response to determining that the set of caller credentials are a match to the corresponding set of registered credentials.

21. The system according to claim 11, wherein the server is further configured to:

execute the first authentication operation to authenticate a caller associated with the inbound call using caller biometric data, wherein when executing the second authentication operation, the server is configured to:

receive the caller biometric data from the caller device; and authenticate the caller as a registered caller in response to determining that the caller biometric data is a match to corresponding registered biometric data.

* * * * *